United States Patent Office 3,535,200
Patented Oct. 20, 1970

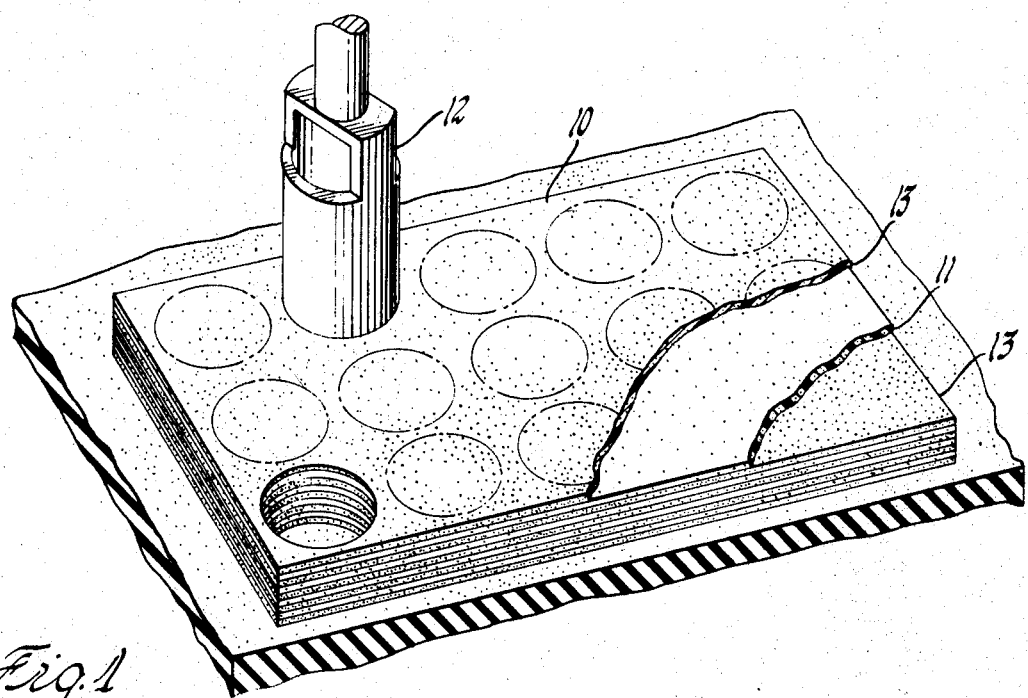
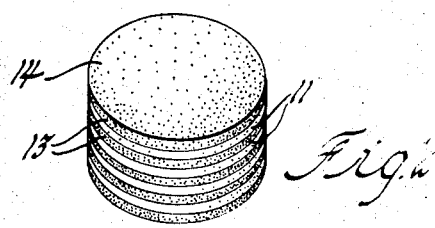
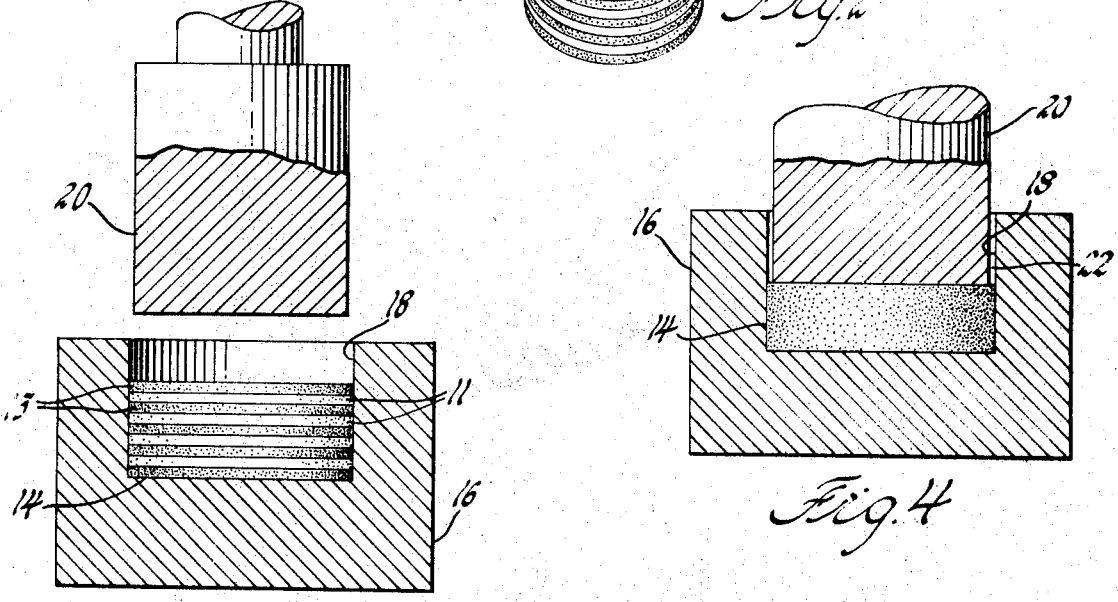

3,535,200
MULTILAYERED MECHANICALLY ORIENTED FERRITE
James W. Bergstrom, Troy, Mich., assignor to General Motors Corporation, Detroit, Mich., a corporation of Delaware
Filed Sept. 18, 1967, Ser. No. 668,471
Int. Cl. C04b 35/26; H01f 1/22, 7/02
U.S. Cl. 161—162                              6 Claims

ABSTRACT OF THE DISCLOSURE

A multilayered mechanically oriented, hard ferrite body and a method of fabricating the same is disclosed. The ferrite body contains alternate layers of mechanically oriented ferrite sheets having a high residual flux density and a low coercive force. Interposed between each pair of the aforementioned ferrite sheets is a layer of a second mechanically oriented ferrite sheet having a low residual flux density and a high coercive force relative to the other ferrite layer. The resultant multilayered ferrite body has a relatively high residual flux density and an intermediate coercive force.

---

This invention relates to mechanically oriented hard ferrite bodies and a method for making the same, and more particularly to a ferrite body having a relatively high residual flux density and an intermediate coercive force.

It is well known that ferrite bodies that are strong magnets, that is, they have a high residual flux density, are produced from ferrite powders that have been ground a short time (1 to 10 hours). However, these ferrite bodies are relatively easily demagnetized, that is, they have a low coercive force. It is also well known that ferrite bodies produced from ferrite powders that have been ground for a long time (60 to 100 hours) will exhibit a high coercive force. However, these ferrite bodies have a low residual flux density. Attempts to produce ferrite bodies which have a high residual flux density and at the same time have a high coercive force have been substantially unsuccessful. For example, ferrite bodies made from a 50–50 mixture of short grind ferrite powders and long grind ferrite powders still produce a ferrite body with properties similar to short grind time powders, that is, a relatively high residual flux density and a low coercive force. Ferrite bodies made from a mixture containing 25 parts short grind ferrite powders and 75 parts long grind ferrite powders will produce a ferrite body with a relatively low residual flux density and an intermediate coercive force.

It is a primary object of this invention to provide a mechanically oriented, hard ferrite body having a relatively high residual flux density and an intermediate coercive force. It is another object of this invention to provide a mechanically oriented, hard ferrite body having an intermediate residual flux density and a high coercive force. It is yet another object of this invention to provide a method for increasing the coercive force of a ferrite body while still retaining an intermediate or high residual flux density.

These and other objects are accomplished by a ferrite body containing alternate layers of mechanically oriented ferrite sheets having a high residual flux density and a low coercive force. Interposed between each pair of the aforementioned sheets are a layer of a second mechanically oriented ferrite sheet having a low residual flux density and a high coercive force relative to the other ferrite layer. The resultant multilayered ferrite body has a relatively high residual flux density and an intermediate coercive force. This ferrite body is produced by mechanically orienting a batch of ferrite powders which have been ground a short time in a ball mill to form a first ferrite sheet. Another batch of ferrite powder having a long grind time is mechanically oriented in a ball mill to form a second ferrite sheet. These sheets are then stacked so that every other ferrite sheet is one which has been formed from the short grind ferrite powder. Raw ferrite bodies are cut from the laminated stack, compacted, prefired, and then sintered at an elevated temperature to form the finished mechanically oriented hard ferrite body.

Other objects and advantages of this invention will be apparent from the following detailed description, reference being made to the accompanying drawings wherein a preferred embodiment of this invention is shown.

In the drawings:

FIG. 1 is a view partly in section and partly in elevation of a laminated stack from which the ferrite bodies are punched;

FIG. 2 is a perspective view of an exemplary disc body which is punched from the laminated stack of FIG. 1;

FIG. 3 is a view, partly in cross section and partly in elevation, of the die assembly for compacting the laminated bodies and expelling a portion of the wax binder therefrom; and FIG. 4 is a view similar to FIG. 3 showing the bodies in the die assembly after compaction.

In general, the process of this invention may be carried out as follows. The ferrite powder is obtained in the conventional manner, that is, the metal oxide reagents are weighed and intimately mixed as a wet slurry. This can be accomplished by mixing the basic metal oxides with distilled water, placing the mixture in a ball mill and operating the ball mill for an adequate time period to assure thorough mixing. The wet mixture of basic metal oxides is then heated in air at a temperature of 180 to 250° F. for 12 to 24 hours to remove moisture. The dried powdered mixture is thereafter sifted with a 20 to 30 mesh screen to remove the stainless steel balls from the ball milling operation. The sifted powder mixture of the basic metal oxides is then placed in saggars which are covered and stacked in a furnace where they are heated at an elevated temperature for a certain length of time, the time and temperautre being determined by the particular metal oxide used. This step is known as calcining and its purpose is to react the ferric oxide with one or more of the bivalent metals selected from the group consisting of bariums, strontium, and lead. Lead ferrite prepared from a mixture of lead oxide and ferric oxide is preferred. The calcining temperature of lead ferrite is 1600 to 1650° F. for 2 hours.

The calcined ferrite is divided into two portions. The first portion is ground in a ball mill as a wet slurry by adding distilled water to the ferrite powder. This first portion of the ferrite powder is ground for a short period of time ranging from about 1 hours to about 10 hours. Thereafter, the short grind ferrite crystal powder is mixed with a wax binder in a rubber mill. The rolls of this rubber mill are maintained at a temperature between 80 to 95° F. to soften the wax so as to make it more receptive to the ferrite crystal powder. The short grind ferrite crystal powder and wax are mixed in a ratio of about 87% powder to 13% wax binder by weight. During the mixing step the rolls of the rubber mill are spaced about 0.020 inch. The wax binder is of the type described in the copending patent application Ser. No. 507,777 assigned to the assignee of the present patent application. An example of a wax binder suitable for the pratice of this invention consists of 78.5 weight percent Ozokorite, a mineral wax or native paraffin mixture of hydrocarbons that are soluble in carbon disulfide, 4.9 weight percent petrolatum and 16.6 weight percent polyisobutylene. This produces a sheeted short grind ferrite material. After the sheeted short grind ferrite material is removed from the rubber mill the space between the rolls is reduced to 0.010 inch.

The rolls are driven in opposite directions at slightly different speeds so as to produce a shearing action on the sheet short grind ferrite material and this mechanically orients the hexagonal plate-like shaped short grind ferrite crystals to yield a material with atmospheric magnetic characteristics. The material is passed through the rolls until substantially all of the hexagonal short grind ferrite crystals are oriented and the surfaces of the sheets are smooth so as to be free of air pockets and cracks. The resultant short grind ferrite sheet has a high residual flux density and a low coercive force.

The ferrite crystals from the second portion referred to above are ground in a ball mill as a wet slurry for a period of time ranging from 60 to 100 hours. These long grind ferrite crystals are subjected to the same steps as outlined above for the short grind ferrite crystals to obtain a long grind ferrite sheet. The resultant long grind ferrite sheet has a low residual flux density and a high coercive force.

The short grind ferrite sheet and the long grind ferrite sheets are then formed into a laminated stack on a hard rubber surface. The short grind ferrite sheets having a high residual flux density and a low coercive force and the long grind ferrite sheets having a low residual flux density and a high coercive force are piled on top of each other so that a long grind ferrite sheet separates each pair of short grind ferrite sheets. A typical laminated stack 10 is indicated in FIG. 1 of the drawings. As indicated previously, a short grind ferrite sheet 11 is positioned between a pair of long grind ferrite sheets 13. The number of layers in the laminated stack, of course, determines the thickness of the ferrite bodies and by following the present method it is possible to obtain a stack thickness of up to ½ inch, that is about 50 sheets. The raw ferrite bodies are formed by using a suitable shaped punch 12. By using a wax binder, the sheets in the laminated stack will stick together and the bodies will not delaminate. After the bodies are punched from the laminated stack, the bodies are placed in heated die assemblies which are maintained at a temperature of about 310° F.

Referring to FIGS. 2 through 4, the raw ferrite bodies punched from the laminated stack of FIG. 1 are in the form of disc 14. However, this shape of body is only exemplary and it is readily apparent that various shapes of bodies, such as toroids, arcuate segments, and the like, can be punched from the laminated stacks. The die assemblies comprise a die body 16 having a cavity 18 suitably shaped to receive the ferrite body 14 and a co-operating die plug 20. The diameter of the die plug is slightly less than the die cavity 18 such that when the plug is inserted into the cavity 18 and placed under pressure a major portion of the wax binder will be expelled from the die cavity in the annular space 22 between the die plug 20 and the die body 16 as seen in FIG. 4.

As alluded to hereinbefore, the raw ferrite-wax binder bodies are composed of 87% ferrite crystals and 13% wax binder when placed in the die assembly. Initially, light pressure from 200 to 500 p.s.i. is exerted between the die body 16 and the die plug 20 for from 5 to 10 minutes thus allowing the bodies to heat up to 310° F., which is the die assembly temperature. At this temperature the wax binder becomes molten and then pressure is increased uniformly to 10,000 p.s.i. over a period of 4 minutes and approximately 60 to 70% of the wax binder is expelled. A pressure of 10,000 p.s.i. is maintained for approximately 1 to 1½ minutes after which it is released and the die assembly is cooled in water.

After compaction in the die, the bodies 14 are again placed in saggars and the saggars are placed in a furnace having a temperature of about 600° F. to prefire the same and thus burn out the remaining portion of the wax binder. Thereafter, the furnace temperature is increased to sinter the ferrite bodies at an elevated temperature for a certain length of time, the time and temperature again being determined by the basic metal oxides that are used. With lead ferrites the temperature for sintering is about 1775 to 1825° F. for a time period ranging from 45 minutes to 90 minutes. After sintering, the ferrite bodies are cooled to room temperature and subsequently they can be magnetized by direct current pulse magnetization.

The present invention may be illustrated by a specific example as follows. A lead ferrite was prepared by weighing out 4 moles of $Fe_2O_3$ and 1 mole of PbO and mixing as a wet slurry in a ball mill until a substantially uniform mixture was obtained. The wet mixture of these two metal oxides was heated in a furnace at a temperature of 250° F. for 12 hours to remove the moisture. The dry powder mixture was sifted through a 20 to 30 mesh screen and placed in saggars. The saggars were covered and stacked in a furnace and heated at a temperature of 1650° F. for 2 hours to react the ferric oxide with the lead oxide to form lead ferrite powder.

A portion of this ferrite powder was ground in a ball mill for 1.5 hours in the presence of distilled water. Then the ferrite powder, 87 parts by weight, and 13 parts by weight wax binder were mixed for 12 minutes in a rubber mill wherein the rolls were 0.020 inch apart. A sheet of short grind ferrite material having a thickness of 0.020 inch was obtained. This ferrite sheet was placed into a rubber mill wherein the space between the rolls had been reduced to 0.010 inch. These rubber sheets were then mechanically oriented in a rubber mill in the conventional manner to produce a mechanically oriented short grind ferrite sheet having a thickness of 0.010 inch.

A second portion of the lead ferrite powder was ground for a period of 100 hours to produce a long grind ferrite powder. This ferrite powder was mixed with wax, rolled into sheet having a thickness of .020 inch and mechanically oriented in the same manner as the short grind material to produce a long grind ferrite sheet having a thickness of 0.010 inch.

Twenty-five sheets of the short grind material and 25 sheets of the long grind material were stacked so that every other layer was a short grind ferrite sheet. The resultant ferrite body was ½ inch thick. A disc was punched from the laminated stack and compressed in a die under a pressure beginning at about 200 p.s.i. and gradually increasing to a pressure of 500 p.s.i. for a period of about 8 minutes. The pressure was increased to 10,000 p.s.i. over a period of 4 minutes and maintained for about 1½ minutes. The bodies were placed in saggars in a furnace and prefired at a temperature of about 600° F. to remove the remaining portion of a wax binder. The ferrite body was sintered at a temperature of 1800° F. for 45 minutes. The multilayered short grind-long grind ferrite body was then magnetized by direct current pulse magnetization. This ferrite body has a residual flux density, $B_r$, of 3640 gauss and a coercive force, $H_c$, of 2050 oersteds.

The following table lists the residual flux density and the coercive force data for the multilayered short grind-long grind ferrite body of this invention, a 100% short grind sheet ferrite body, a 100% long grind sheet ferrite body and a 100% short grind-long grind powder mixture sheet ferrite body.

TABLE

| Ferrite Body | Residual flux density, gauss | Coercive force, oersted |
|---|---|---|
| Alternate layers, 50% short grind sheets, 50% long grind sheets | 3,640 | 2,050 |
| 100% short grind sheets | 3,690 | 1,610 |
| 100% long grind sheets | 3,250 | 2,430 |
| 50% short grind—50% long grind powder mixture sheets | 3,550 | 1,750 |

As shown in the preceding table, the residual flux density of the multilayered ferrite body of this invention is almost as high as the 100% short grind ferrite body. The coercive force of the multilayered body is intermediate between the short grind ferrite body and the long grind ferrite body. Both the residual flux density and the coercive force of the multilayered ferrite body is higher than that obtained by mixing the short grind powder and the long grind powder together to form a uniform mixture.

In the specific example referred to above, both the short grind sheets and the long grind sheets were of equal thickness, that is 0.010 inch thick. Another embodiment of this invention would be a multilayered ferrite body consisting of alternate layer structures in which the thickness of the long grind sheets would be thicker than the short grind sheets. This would increase the coercive force property of the resultant ferrite body while the residual flux density would be somewhat lower. By varying the thickness ratio between the short grind sheets and the long grind sheets, it is possible to obtain an infinite number of ferrite bodies having residual flux densities ranging from intermediate to high and a coercive force ranging from high to intermediate.

Another embodiment of this invention is the use of a multilayered short grind sheet-long grind sheet structure in which the ferrites that are used are different. An example of this would be to use a lead ferrite having 4 moles of $Fe_2O_3$ for the short grind ferrite material, since it is well known that this ferrite material has a high residual flux density characteristic. A lead ferrite having 6 moles of $Fe_2O_3$ would be used for the long grind sheets, since it is known that this material has a high coercive force characteristic. The resultant ferrite body would contain layers of short grind 4 moles of $Fe_2O_3$ lead ferrite and layers of long grind 6 moles of $Fe_2O_3$ lead ferrite. This ferrite body would have a higher residual flux density and a higher coercive force than the ferrite body described in detail earlier.

While the invention has been described in terms of specific examples, it is to understood that the scope of this invention is not limited thereby except as defined in the following claims.

I claim:
1. A multilayered mechanically oriented hard ferrite body comprising a plurality of layers of a first ferrite sheet having a high residual flux density and a low coercive force and interposed between each pair of said first ferrite layers, a layer of a second ferrite sheet having a low residual flux density and a high coercive force relative to said first ferrite layer, said first ferrite layers and said second ferrite layers being integrally bonded into a unitary solid self-supporting laminated ferrite structure having a relatively high residual flux density and an intermediate coercive force.

2. A multilayered mechanically oriented hard ferrite body as described in claim 1 wherein the thickness of said first ferrite layer is substantially the same as the thickness of said second ferrite layer.

3. A multilayered mechanically oriented hard ferrite body as described in claim 1 wherein said first ferrite and said second ferrite are lead ferrites having a molar ratio of 4 moles of $F_2O_3$ to 1 mole of PbO.

4. A multilayered mechanically oriented hard ferrite as described in claim 1 wherein said first ferrite and said second ferrite are lead ferrites having a molar ratio of 6 moles of $Fe_2O_3$ to 1 mole of PbO.

5. A multilayered mechanically oriented hard ferrite body as described in claim 1 wherein said first ferrite layer is a lead ferrite having a molar ratio of 4 moles of $Fe_2O_3$ to 1 mole of PbO and said second ferrite layer is a lead ferrite having a molar ratio of 6 moles of $Fe_2O_3$ to 1 mole of PbO.

6. A multilayered mechanically oriented hard ferrite body comprising a plurality of layers of a first ferrite sheet having a high residual flux density and a low coercive force, and interposed between each pair of said first ferrite sheet layers, a layer of a second ferrite sheet having a low residual flux density and a high coercive force relative to said first ferrite layer, said first ferrite layer being thinner than said second ferrite layer, said first ferrite layer and said second ferrite layers being integrally bonded to a unitary, solid, self-supporting laminated ferrite structure having an intermediate residual flux density and a high coercive force.

References Cited
UNITED STATES PATENTS

| | | | |
|---|---|---|---|
| 3,065,181 | 11/1962 | Robinson | 252—62.63 |
| 3,096,185 | 7/1963 | Lucero | 252—62.63 |
| 3,126,617 | 3/1964 | Blume | 335—302 |
| 3,337,461 | 8/1967 | Cochardt | 252—62.63 |
| 3,359,152 | 12/1967 | Blume | 161—162 |
| 3,424,685 | 1/1969 | Pierrot et al. | 252—62.63 |
| 3,428,416 | 2/1969 | Gie et al. | 252—62.63 |

JOHN T. GOOLKASIAN, Primary Examiner

G. W. MOXON II, Assistant Examiner

U.S. Cl. X.R.

161—166, 225; 252—62.63; 335—302